United States Patent
Sandoval

(10) Patent No.: US 10,809,924 B2
(45) Date of Patent: Oct. 20, 2020

(54) EXECUTABLE MEMORY PROTECTION

(71) Applicant: Webroot Inc., Broomfield, CO (US)

(72) Inventor: Andrew L. Sandoval, San Antonio, TX (US)

(73) Assignee: Webroot Inc., Broomfield, CO (US)

(*) Notice: Subject to any disclaimer, the term of this patent is extended or adjusted under 35 U.S.C. 154(b) by 278 days.

(21) Appl. No.: 15/951,861

(22) Filed: Apr. 12, 2018

(65) Prior Publication Data

US 2019/0317676 A1 Oct. 17, 2019

(51) Int. Cl.
*G06F 3/06* (2006.01)

(52) U.S. Cl.
CPC .......... *G06F 3/0622* (2013.01); *G06F 3/0653* (2013.01); *G06F 3/0673* (2013.01)

(58) Field of Classification Search
CPC .... G06F 3/0622; G06F 3/0653; G06F 3/0673; G06F 12/1441; G06F 21/6281; G06F 21/79; G06F 12/1425; G06F 2212/1052
See application file for complete search history.

(56) References Cited

U.S. PATENT DOCUMENTS

| | | | | |
|---|---|---|---|---|
| 7,769,992 | B2* | 8/2010 | Wang | G06F 21/575 713/1 |
| 2005/0108516 | A1* | 5/2005 | Balzer | G06F 9/468 713/150 |
| 2006/0225135 | A1* | 10/2006 | Cheng | G06F 12/1063 726/26 |
| 2010/0082929 | A1* | 4/2010 | Kobayashi | G06F 12/1441 711/163 |
| 2013/0247053 | A1* | 9/2013 | Therrien | G06F 9/52 718/102 |
| 2014/0189261 | A1* | 7/2014 | Hildesheim | G06F 12/1027 711/152 |
| 2016/0239664 | A1* | 8/2016 | Levine-Fraiman | G06F 21/56 |
| 2016/0283402 | A1* | 9/2016 | Schulz | G06F 12/145 |
| 2018/0074976 | A1* | 3/2018 | Norris | G06F 12/1425 |

* cited by examiner

*Primary Examiner* — Francisco A Grullon
(74) *Attorney, Agent, or Firm* — Sprinkle IP Law Group

(57) ABSTRACT

Examples of the present disclosure describe systems and methods for executable memory protection. In an example, calls to a memory API may be monitored to identify protection attributes of the associated memory. If software requests access to memory that is both executable and writeable, different protection attributes may be used to limit the availability of memory that is both executable and writeable. Subsequently, if software attempts to access the memory in a way not permitted by the different protection attributes, a resulting memory exception may be evaluated to determine whether to modify the memory protection attributes. In examples, the memory protection attributes may be updated accordingly (e.g., to be made executable but not writeable, writeable but not executable, etc.) and execution of the set of software instructions may resume. Thus, memory that is both executable and writeable may be reduced or eliminated; decreasing the likelihood of exploitation by malicious software.

20 Claims, 6 Drawing Sheets

EXECUTABLE MEMORY PROTECTION

BACKGROUND

In examples, a set of software instructions executed by a computing device may allocate memory that may be accessed during execution. However, in some examples, the memory may be both executable and writeable, which may provide a potential attack vector for malicious software.

It is with respect to these and other general considerations that the aspects disclosed herein have been made. Also, although relatively specific problems may be discussed, it should be understood that the examples should not be limited to solving the specific problems identified in the background or elsewhere in this disclosure.

SUMMARY

Examples of the present disclosure describe systems and methods for executable memory protection. In an example, calls by a set of software instructions to memory application programming interfaces (APIs) may be monitored to identify one or more protection attributes associated with the memory being allocated. If the set of software instructions requests access to memory that is both executable and writeable, the memory may be provided with different protection attributes so as to limit the availability of memory that is both executable and writeable. For example, at least one of the executable and writeable protection attributes may be stripped from at least a part of the associated memory.

If the set of software instructions attempts to access the allocated memory in a way that is not permitted by the different protection attributes during execution, a memory exception may be generated. Accordingly, the threat processor may use a memory exception handler to catch the memory exception and may determine whether to modify the memory protection attributes. If it is determined that the memory protection attributes should be modified, the memory protection attributes may be updated accordingly (e.g., the memory may be made executable but not writeable, writeable but not executable, etc.) and execution of the set of software instructions may resume. Thus, the presence of memory that is both executable and writeable may be reduced or eliminated, thereby decreasing the likelihood of exploitation by malicious software.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Additional aspects, features, and/or advantages of examples will be set forth in part in the description which follows and, in part, will be apparent from the description, or may be learned by practice of the disclosure.

BRIEF DESCRIPTION OF THE DRAWINGS

Non-limiting and non-exhaustive examples are described with reference to the following figures.

DETAILED DESCRIPTION

Figure 1:
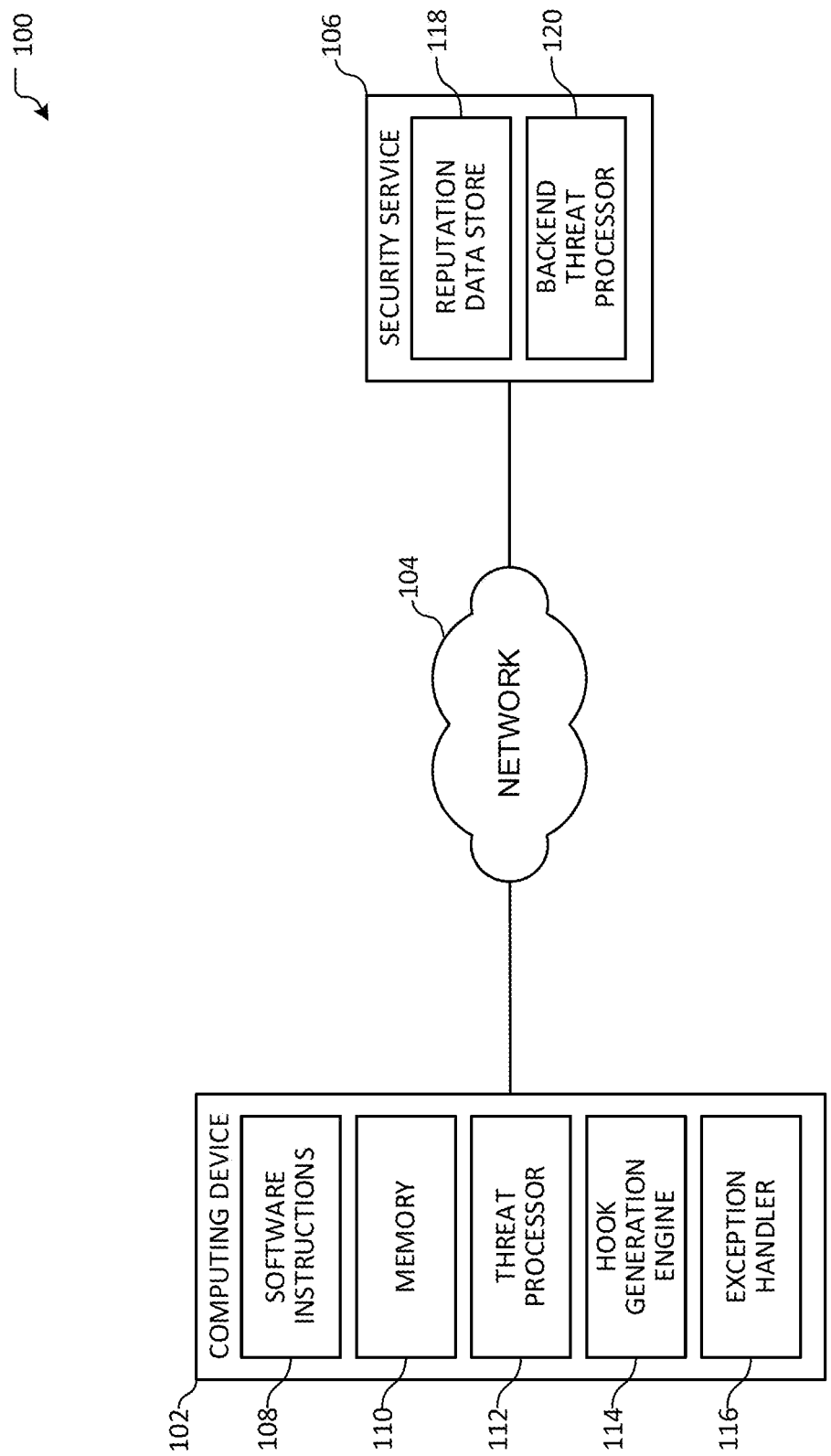
FIG. 1 illustrates an overview of an example system for executable memory protection.

Various aspects of the disclosure are described more fully below with reference to the accompanying drawings, which form a part hereof, and which show specific example aspects. However, different aspects of the disclosure may be implemented in many different forms and should not be construed as limited to the aspects set forth herein; rather, these aspects are provided so that this disclosure will be thorough and complete, and will fully convey the scope of the aspects to those skilled in the art. Aspects may be practiced as methods, systems or devices. Accordingly, aspects may take the form of a hardware implementation, an entirely software implementation or an implementation combining software and hardware aspects. The following detailed description is, therefore, not to be taken in a limiting sense.

In an example, memory may be allocated for use by a set of software instructions executed by a computing device. As will be appreciated by a person having skill in the art, the allocated memory may be used to store data, to perform operations, etc. The memory may have one or more protection attributes associated with it, such that various subparts of the allocated memory may be readable, writeable, executable, or any combination thereof. However, in some instances, memory that is both executable and writeable may enable the potential for the execution of arbitrary software instructions. While certain sets of software instructions may benefit from and/or require such memory access (e.g., setting code hooks, performing just-in-time code compilation, etc.), the presence of memory that is both executable and writeable may pose a significant security threat if exploited by malicious software.

Accordingly, the present disclosure provides systems and methods for executable memory protection. In an example, calls to memory application programming interfaces (APIs) by a set of software instructions may be monitored in order to identify the type of specified or requested protection attributes. For example, a threat processor may generate one or more hooks on memory APIs useable to allocate, deallocate, and/or manage memory protection attributes. If the set of software instructions requests memory that is both executable and writeable, memory may be provided with different protection attributes. For example, at least one of the executable and writeable protection attributes may be stripped from at least a part of the associated memory.

Subsequently, if the set of software instructions attempts to access the allocated memory in a way not permitted by the different protection attributes, a memory exception may be generated. Accordingly, the memory exception may be handled by the threat processor to determine whether to modify the memory protection attributes. If it is determined that the memory protection attributes should be modified, the memory protection attributes may be updated accordingly (e.g., the memory may be made executable but not writeable, writeable but not executable, etc.) and execution of the set of software instructions may resume. As a result, the presence of memory that is both executable and writeable may be reduced or eliminated, thereby reducing the likelihood of exploitation by malicious software.

In examples, a computing device may be any of a variety of devices, including, but not limited to, a mobile computing device, a tablet computing device, a desktop or laptop computing device, an Internet of Things (IoT) computing device, a server computing device, or a distributed computing device (e.g., which may be comprised of a plurality of computing devices).

As used herein, "software," "software instructions," and a "set of software instructions" may be used interchangeably. Example software may include applications, plugins, scripts, modules, drivers, and/or web applications, among other examples. In some examples, software may be pre-compiled, compiled at runtime, or interpreted at runtime. In another example, software may execute in kernel mode, user mode, or a combination thereof.

In some examples, one or more hooks may be generated by a threat processor in order to determine when a memory API is called by a set of software instructions. For example, a memory API may enable a set of software instructions to allocate memory, deallocate memory, and/or alter memory protection attributes, etc. In an example, the hook may be generated by replacing, overwriting, or altering aspects of the API in order to intercept a call to the API. In another aspect, intercept and/or event handlers may be generated in order to determine when a given intercept or event occurs. As an example, a memory exception handler may be registered according to aspects disclosed herein to determine when a set of software instructions attempts to access memory in a way that is not currently allowed by the associated protection attributes (e.g., attempting to execute non-executable memory, attempting to write to read- and/or execute-only memory, etc.). It will be appreciated that while examples herein are described with respect to an example configuration of hooks and/or handlers to intercept or manage execution, other techniques may be used to achieve similar functionality.

When a set of software instructions executed by a computing device calls a memory API (e.g., to allocate memory, deallocate memory, and/or alter memory protection attributes), a generated hook may cause execution to be passed to a threat processor. In some examples, execution may be passed to a threat processor executing in user mode (e.g., an application, a service, etc.) or a threat processor executing in kernel mode (e.g., provided by a kernel module, a system service, etc.), or a combination thereof. In an example, the threat processor may evaluate aspects of the memory API call, including, but not limited to, the amount, range, and/or region of memory associated with the API call, as well as the specified or requested protection attributes. Accordingly, memory information associated with the memory API call may be stored, such that the memory information may be later retrieved (e.g., when processing a memory exception, as described herein). For example, the memory information may comprise an indication relating to one or more protection attributes associated with the range of memory of the memory API call. While example memory information is described herein, it will be appreciated that additional and/or alternative memory information may be stored according to aspects disclosed herein.

If the protection attributes associated with the memory API call indicate memory that would be both executable and writeable, the protection attributes may be updated to yield memory that is either executable or writeable, but not both.

In some examples, determining whether the protection attributes should be updated may comprise an evaluation of the set of software instructions and/or the called memory API to determine which type of memory is needed by the set of software instructions. It will be appreciated that other factors or evaluation techniques may be used to determine the way in which the protection attributes should be modified.

In other examples, it may be determined that the set of software instructions needs memory that is simultaneously executable and writeable, as may be the case for a set of software instructions that is self-modifying, among other examples. In such examples, the set of software instructions may be evaluated based on security criteria to determine whether memory having such protection attributes should be made available to the set of software instructions. In an example, a prompt may be presented to a user, wherein user input may be received indicating whether the set of software instructions should be permitted to have both executable and writeable memory. In an example, the prompt may comprise a display of information associated with the memory API call (e.g., information relating to the set of software instructions, information relating to an evaluation of the security criteria, education materials, etc.) and/or one or more suggested actions. If it is determined that the set of software instructions should have access to memory that is both executable and writeable, the protection attributes may remain unmodified, or may be restored to the originally requested protection attributes if the originally requested protection attributes allowed access to memory that is simultaneously writeable and executable. Otherwise, the protection attributes may be modified as discussed above. In other examples, execution of the set of software instructions may be terminated.

Example security criteria include whether the set of software instructions is digitally signed by a trusted certificate and/or a certificate issued by a trusted certificate authority, whether the set of software instructions is listed in a security catalog, whether the set of software instructions has been whitelisted (e.g., by a user, by a system administrator, by an automated process, etc.), and/or an analysis of reputation information from a security service (e.g., whether the set of software instructions has been identified as potentially malicious, whether the reputation of the set of software instructions is below a threshold, etc.). In some examples, the type and/or rigor of the evaluation that is performed may vary depending on a variety of factors, including, but not limited to, the type of software (e.g., whether the software is an application, a plugin, a driver, etc.) and/or whether the software is executing in user mode and/or kernel mode. In other examples, at least some aspects of the evaluation may be cached, thereby potentially reducing the computing overhead associated with repeatedly evaluating such security criteria.

Once the threat processor has finished generating memory information and/or modifying the protection attributes associated with the memory API, execution of the set of software instructions may resume. It will be appreciated that, in some examples, the threat processor may determine that the protection attributes associated with the memory API call do not indicate a call associated with both executable and writeable memory (e.g., it may instead relate to read-only memory, write-only memory, read/write memory, read/execute memory, etc.). In such examples, memory information may not be generated and the protection attributes may not be modified, because memory having such protection attributes may not pose the same computer security threat as memory that is both executable and writeable.

In an example where the protection attributes are modified, execution of the set of software instructions may eventually result in a memory exception. For example, if the protection attributes were modified to remove an indication of writeable memory, an attempt by the set of software instructions to write to the memory may fail. In another example, if the protection attributes were modified to remove an indication of executable memory, an attempt by the set of software instructions to execute the memory may fail. However, in other examples, execution of the set of software instructions may not eventually result in a memory exception, as may be the case when a set of software instructions allocates memory having more permissive protection attributes than are actually necessary to execute the set of software instructions. For example, executable and writeable memory may be allocated by a set of software instructions, but the memory may never actually be executed. Thus, if the set of software instructions was provided memory that is only writeable, a memory exception may not occur given the set of software instructions never attempts to execute the allocated memory during execution.

In examples where a memory exception occurs, an exception handler may catch the exception and provide an indication to the threat processor. Accordingly, the threat processor may determine which type of memory access is needed by the set of software instructions to continue execution. In examples, the threat processor may determine whether the set of software instructions should be granted the requested type of memory access. The determination may comprise evaluating memory information that was previously stored to determine whether the set of software instructions had previously generated a call to a memory API for memory having protection attributes similar to the requested type of memory access that resulted in the memory exception. In another example, the determination may comprise evaluating one or more security criteria. In some examples, a prompt may be generated, wherein the prompt may receive a user indication (e.g., from a user of the computing device, from a system administrator, etc.) as to whether the set of software instructions should be provided with the requested type of memory access. In an example, the prompt may comprise a display of information associated with the memory API call (e.g., information relating to the set of software instructions, information relating to an evaluation of the security criteria, education materials, etc.) and/or one or more suggested actions. In another example, the prompt may be informational to warn the user, such that the determination may be performed automatically without receiving input from the user.

If it is determined that the set of software instructions should be granted the requested type of memory access, the protection attributes of the memory associated with the memory exception may be modified accordingly. For example, if writeable memory was requested or expected by the set of software instructions, the protection attributes may be modified to provide memory that is writeable but not executable. In another example, if executable memory was requested or expected by the set of software instructions, the protection attributes may be modified to provide memory that is executable but not writeable. The set of software instructions may then be permitted to continue execution. Thus, the set of software instructions may not have simultaneous access to memory that is both executable and writeable, but may instead trigger the protection attribute modification process described herein in order to alternate between executable and writeable memory as needed to continue execution.

As described above, certain instances may exist where a set of software instructions requires access to memory that is executable and writeable. In such instances, a similar determination may be used in order to determine whether to provide the set of software instructions access to such memory. In examples where it is determined that the set of software instructions should not have access to memory having the requested protection attributes, execution of the set of software instructions may be terminated, execution may be permitted to continue with the pre-existing (e.g., unmodified) protection attributes, and/or data may be gathered for contemporaneous or later analysis. Thus, aspects disclosed herein enable relatively unencumbered execution of a given set of software instructions without a significant detrimental impact to software behavior in cases where executable and writeable memory is used during software execution (either separately or simultaneously), while still reducing the presence of memory that is both executable and writeable unless otherwise necessary.

FIG. 1 illustrates an overview of an example system 100 for executable memory protection. As illustrated, system 100 is comprised of computing device 102, network 104, and security service 106. In an example, computing device 102 and security service 106 may communicate by way of network 104. As an example, computing devices 102 and security service 106 may communicate using wired and/or wireless connections to network 104. While system 100 is illustrated as having one computing device 102, one network 104, and one security service 106, it will be appreciated that other examples may comprise alternate quantities of such elements.

Computing device 102 may be any of a variety of devices, including, but not limited to, a mobile computing device, a tablet computing device, a desktop or laptop computing device, an IoT computing device, a server computing device, or a distributed computing device. Computing device 102 is illustrated as comprising software instructions 108, memory 110, threat processor 112, hook generation engine 114, and exception handler 116. In some examples, computing device 102 may form at least a part of an execution environment in which an operating system (OS) and/or other software may execute.

For example, software instructions 108 may execute on computing device 102. Software instructions 108 may be an application, a plugin, a script, a module, a driver, and/or a web application, among other examples. In some examples, software instructions 108 may be pre-compiled, compiled at runtime, or interpreted at runtime. In another example, software instructions 108 may execute in kernel mode, user mode, or a combination thereof.

Software instructions 108 may allocate and use memory 110 during execution by computing device 102. In examples, software instructions 108 may call one or more memory APIs that are available in the execution environment of computing device 102. As an example, a memory API may be used to allocate memory, deallocate memory, alter memory protection attributes, and/or perform other operations on at least a part of memory 110 by software instructions 108. While examples are discussed herein with respect to various memory APIs, it will be appreciated that, in other examples, a memory API may comprise any of a wide variety of software interfaces, commands, libraries, or services, among others, useable to manipulate and/or interact with memory 110.

As illustrated, computing device 102 further comprises threat processor 112. In an example, threat processor 112 may perform aspects disclosed herein in order to provide memory protection from malicious or potentially malicious software. In some examples, threat processor 112 may generate memory information, which may comprise information relating to one or more protection attributes associated with a memory API call of software instructions 108. For example, the memory information may be generated when software instructions 108 are first executed by computing device 102. In another example, threat processor 112 may modify protection attributes of at least a part of memory 110 that is associated with software instructions 108. As an example, threat processor 112 may change protection attributes to permit execution but not writing or writing but not execution, among other protection attributes. In other examples, threat processor 112 may evaluate generated memory information, security criteria, and/or user input to determine the protection attributes that should be applied to at least a part of memory 110. In examples, threat processor 112 may generate one or more hooks to determine when software instructions 108 calls a memory API using hook generation engine 114. In other examples, threat processor 112 may receive an indication of a memory exception by software instructions 108 as a result of a registered exception handler, such as exception handler 116.

Hook generation engine 114 may generate one or more hooks on memory APIs of computing device 102. In some examples, hook generation engine 114 may generate a hook by replacing, overwriting, or altering aspects of a memory API in order to intercept a call to the memory API by software instructions 108, such that an indication may be provided and/or execution may be passed to threat processor 112. In another aspect, exception handler 116 may be used to handle memory exceptions in order to provide an indication to and/or pass execution to threat processor 112. While hook generation engine 114 and exception handler 116 are illustrated as separate elements of computing device 102, it will be appreciated that, in other examples, similar functionality may be provided by fewer, additional, or alternative elements. Further, it will be appreciated that while examples herein are described with respect to an example configuration of hooks and/or handlers to intercept or manage execution, other techniques may be used to achieve similar functionality.

System 100 also comprises security service 106. In an example, security service 106 may be a service for providing computer security for one or more computing devices (e.g., computing device 102). It will be appreciated that while security service 106 is illustrated as comprising elements 118-120, fewer, additional, or alternative elements may be used, or security service 106 may be provided as part of a distributed computing device or a cloud-computing system. In some examples, various aspects described above with respect to computing device 102 may additionally or alternatively be performed by security service 106. As illustrated, security service 106 comprises reputation data store 118 and backend threat processor 120. In some examples, threat processor 112 may be provided by and/or may communicate with security service 106 in order to provide computer security to computing device 102.

In an example, reputation data store 118 may comprise reputation information. In some examples, backend threat processor 120 may receive a request from threat processor 112 for reputation information associated with a set of software instructions, which may be provided in response and may be used by threat processor 112 when evaluating security criteria according to aspects disclosed herein. In an example, reputation information may relate to a set of software instructions (e.g., software instructions 108). As an example, reputation information may comprise a score, a threat type (e.g., ransomware, adware, etc.), a threat name, a threat description, a severity level, and/or permitted memory protection attributes, among other information. In some examples, reputation information associated with a set of software instructions stored by reputation data store 118 may be indexed based on an identifier.

Example identifiers include, but are not limited to, a hash, a fingerprint, a signature, or a globally unique identifier (GUID). In some examples, at least a part of the reputation information stored by reputation data store 118 may be cached by computing device 102. In other examples, computing device 102 may store one or more whitelists and/or blacklists, which may comprise indications (e.g., as may be received from a user, a system administrator, etc.) of software that is benign or malicious, among other indications. In such examples, entries in a whitelist and/or blacklist stored by computing device 102 may be aggregated by backend threat processor 120 and stored by reputation data store 118, thereby generating crowd-sourced reputation information.

In some examples, threat processor 112 may gather data associated with the execution of software instructions 108. In examples, the data may be gathered when software instructions 108 are determined to not be permitted access to memory having requested protection attributes (e.g., when software instructions 108 are denied access to memory that is executable, writeable, executable and writeable, etc.), among other instances. The gathered data may comprise a memory dump, a stack trace, a crash dump, and/or one or more files associated with software instructions 108, among other data. In some examples, a user may opt-in to such data gathering. In an example, threat processor 112 may evaluate the gathered data contemporaneously or after execution of software instructions 108. In other examples, threat processor 112 may provide at least a part of the gathered data to backend threat processor 120, such that security service 106 may evaluate the gathered data. In another example, at least a part of the evaluation may be performed by both threat processor 112 and backend threat processor 120.

The gathered data may be evaluated to generate and/or update reputation information, which may be stored by computing device 102 and/or reputation data store 118. In some examples, the evaluation may comprise executing at least a part of the gathered data in a sandbox, virtual machine, or other environment. In other examples, the evaluation may comprise evaluating the gathered data based on heuristics and/or any of a variety of machine learning algorithms. Accordingly, the gathered data may enable security service 106, threat processor 112, and/or backend threat processor 120 to provide protection against previously unknown or unconfirmed threats. While example evaluation techniques and gathered data are described herein, it will be appreciated that other techniques and data may be used without departing from the spirit of this disclosure.

Figure 2:
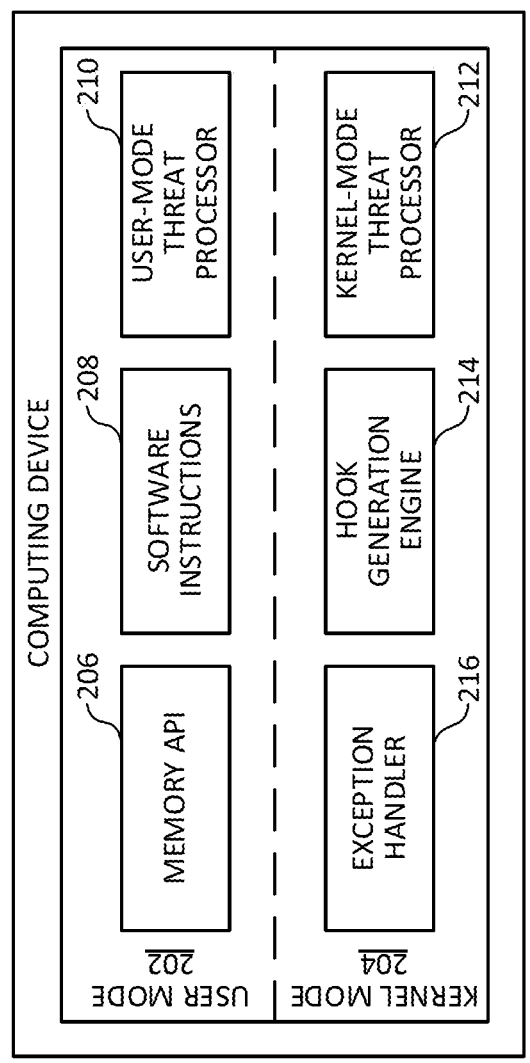
FIG. 2 illustrates an overview of an example computing device with which aspects of executable memory protection may be performed.

FIG. 2 illustrates an overview of an example computing device 200 with which aspects of executable memory protection may be performed. In an example, computing device 200 may be any of a variety of devices, including, but not limited to, a mobile computing device, a tablet computing device, a desktop or laptop computing device, an IoT computing device, a server computing device, or a distributed computing device. In some examples, computing device 200 may form at least a part of an execution environment in which an OS and/or other software (e.g., software instructions 208) may execute.

As illustrated, computing device 200 is comprised of user mode 202, kernel mode 204, memory API 206, software instructions 208, user-mode threat processor 210, exception handler 216, hook generation engine 214, and kernel-mode threat processor 212. In some examples, memory API 206 may be useable by software executed by computing device 200 (e.g., software instructions 208) to manipulate and/or interact with memory of computing device 200.

Hook generation engine 214 may generate one or more hooks on memory APIs of computing device 200, such as memory API 206. In some examples, hook generation engine 214 may generate a hook by replacing, overwriting, or altering aspects of a memory API in order to intercept a call to the memory API by software instructions 208, such that an indication may be provided and/or execution may be passed to a threat processor (e.g., user-mode threat processor 210 and/or kernel-mode threat processor 212). In another aspect, exception handler 216 may be used to handle memory exceptions in order to provide an indication to and/or pass execution to a threat processor (e.g., user-mode threat processor 210 and/or kernel-mode threat processor 212). While hook generation engine 214 and exception handler 216 are illustrated as separate elements of computing device 200, it will be appreciated that, in other examples, similar functionality may be provided by fewer or additional elements. Further, it will be appreciated that while examples herein are described with respect to an example configuration of hooks and/or handlers to intercept or manage execution, other techniques may be used to monitor API calls by software instructions 208.

Computing device 200 is illustrated as comprising user mode 202 and kernel mode 204. In examples, certain system-level functionality may be restricted to software operating in kernel mode 204, while other software may instead have access to functionality available in user mode 202. Such a division between user mode 202 and kernel mode 204 may provide various security benefits (e.g., decreased exploitability of software bugs, improved handling of user permissions, etc.) and may ensure system-level functionality is not easily accessed by a set of software instructions. While an example separation between user mode 202 and kernel mode 204 is described herein, it will be appreciated that other separations may be used (e.g., additional, alternative, or fewer, etc.) without departing from the spirit of this disclosure. For example, while memory API 206 is illustrated in user mode 202, it will be appreciated that a memory API may alternatively or additionally exist in kernel mode 204. Similarly, an exception handler and/or a hook generation engine may be provided as part of user mode 202 as an alternative or in addition to exception handler 216 and/or hook generation engine 214 illustrated in kernel mode 204.

As illustrated, software instructions 208 may be executed in user mode 202. In an example, software instructions may call memory API 206 during execution. According to aspects disclosed herein, a hook may have been generated (e.g., by hook generation engine 214), such that user-mode threat processor 210 may receive an indication that memory API 206 has been called by software instructions 208. In other examples, user-mode threat processor 210 may receive an indication of a memory exception by exception handler 216 when software instructions 208 attempts to access allocated memory in a way not permitted by the protection attributes currently associated with the memory.

When user-mode threat processor 210 receives such an indication, user-mode threat processor 210 may receive execution control, such that user-mode threat processor 210 may perform any of a variety of operations before execution returns to memory API 206 and/or software instructions 208. While example operations are described herein as occurring prior to continued execution, it will be appreciated that at least some of the operations may alternatively or additionally be performed substantially contemporaneously with continued execution and/or after execution, among other examples.

In some examples, user-mode threat processor 210 may subsequently call kernel-mode threat processor 212, such that at least a part of the operations and/or evaluations disclosed herein may be performed in kernel mode 204. In other examples, execution may be passed directly to kernel-mode threat processor 212 by a hook on memory API 206 and/or by exception handler 216, rather than being indirectly called via user-mode threat processor 210. In examples, kernel-mode threat processor 212 may be used in order to provide increased security or to perform processing using resources that may be otherwise unavailable from user mode 202, among other reasons. As an example, kernel-mode threat processor 212 may be used to perform operations involving accessing and/or allocating memory, because performing such operations using user-mode threat processor 210 may trigger a hook on memory API 206, which may result in a loop.

In another example, kernel-mode threat processor may subsequently call user-mode threat processor 210, such that at least a part of the operations and/or evaluations disclosed herein may be performed in user mode 202. In some examples, user-mode threat processor 210 may be used because user-mode threat processor 212 may be more easily updated or maintained as a result of the potentially less stringent security restrictions that may be afforded by user mode 202. It will be appreciated that aspects disclosed herein may be performed using user-mode threat processor 210, kernel-mode threat processor 212, or a combination thereof.

As described above, user-mode threat processor 210 and/or kernel-mode threat processor 212 may evaluate a call to memory API 206 by software instructions 208. In some examples, user-mode threat processor 210 and/or kernel-mode threat processor 212 may generate memory information, which may comprise information relating to one or more protection attributes associated with the call to memory API 206. For example, the memory information may be generated when software instructions 208 is first executed by computing device 200. In another example, user-mode threat processor 210 and/or kernel-mode threat processor 212 may modify protection attributes of at least a part of memory that is associated with software instructions 208. As an example, user-mode threat processor 210 and/or kernel-mode threat processor 212 may change protection attributes to permit execution but not writing, or writing but not execution, among other protection attributes. In other examples, user-mode threat processor 210 and/or kernel-mode threat processor 212 may evaluate generated memory information, security criteria, and/or user input to determine the protection attributes that should be applied to at least a part of the memory of computing device 200 used by software instructions 208.

Example security criteria include whether the set of software instructions is digitally signed by a trusted certificate and/or a certificate issued by a trusted certificate authority, whether the set of software instructions is listed in a security catalog, whether the set of software instructions has been whitelisted (e.g., by a user, by a system administrator, by an automated process, etc.), and/or an analysis of reputation information (e.g., as may be stored by a reputation data store, provided by a security service, etc.). For example, a security catalog may be provided by an OS executing on computing device 200, and may comprise one or more hashes, GUIDs, or other information that may be used to validate the security of various system software. In some examples, the type and/or rigor of the evaluation that is performed may vary depending on a variety of factors, including, but not limited to, the type of software (e.g., whether the software is an application, a plugin, a driver, etc.), whether the software is executing in user mode 202 and/or kernel mode 204, and/or the type of API called by the software.

Figure 3:
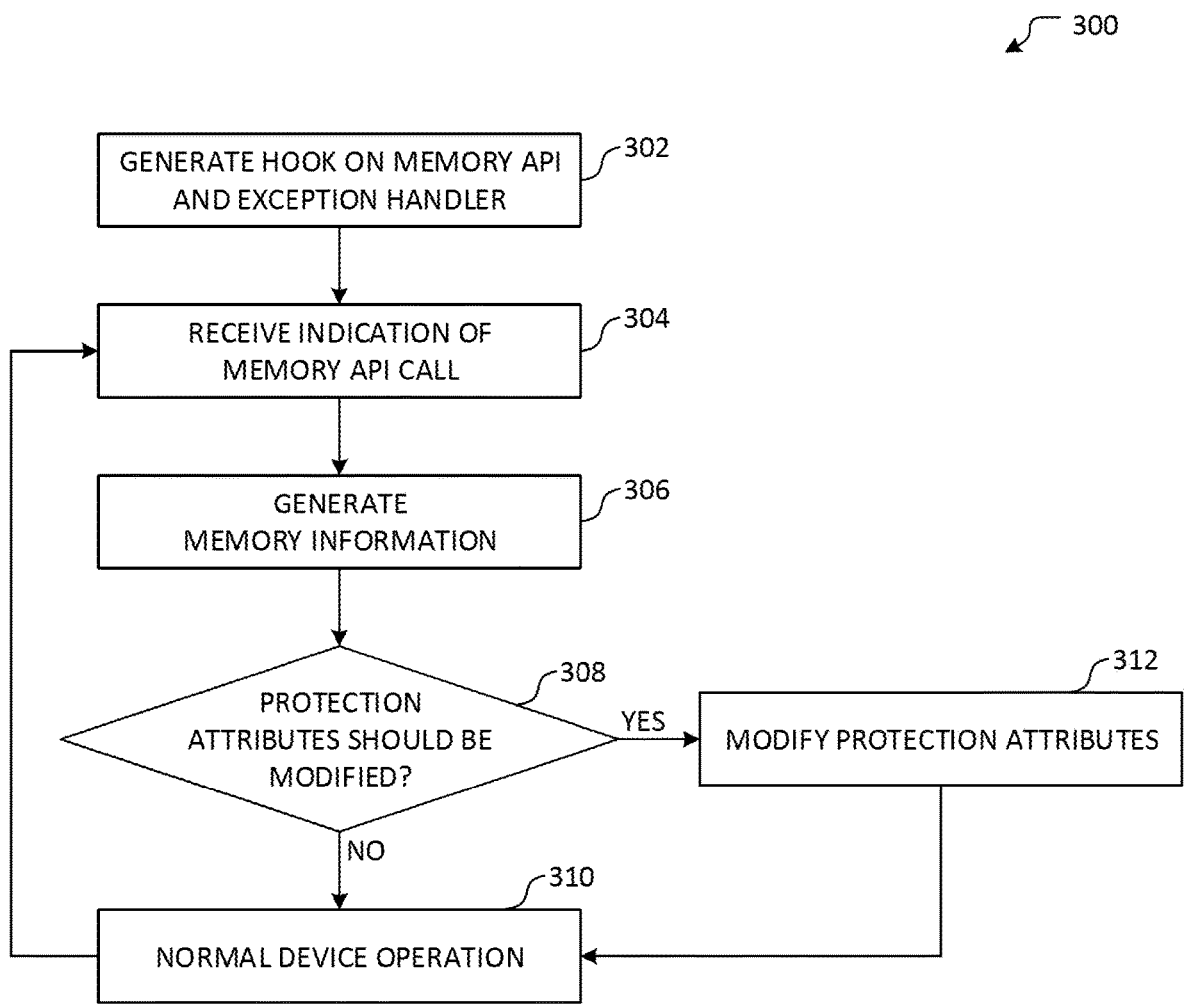
FIG. 3 illustrates an overview of an example method for executable memory protection.

FIG. 3 illustrates an overview of an example method 300 for executable memory protection. In an example, method 300 may be performed by a computing device, such as computing device 102 in FIG. 1 or computing device 200 in FIG. 2. In some examples, aspects of method 300 may be performed by a threat processor, such as threat processor 112 in FIG. 1 or user-mode threat processor 210/kernel-mode threat processor 212 in FIG. 2.

Method 300 begins at operation 302, where a hook may be generated on a memory API and an exception handler may be registered. As an example, the hook may be generated by a hook generation engine, such as hook generation engine 114 in FIG. 1 or hook generation engine 214 in FIG. 2. As described herein, the hook may provide indication to a threat processor when the memory API is called by a set of software instructions, while the exception handler may handle a memory exception that occurs when the set of software instructions attempts to access memory in a way not permitted by the protection attributes currently associated with the memory. While examples are described herein using a combination of hooks and exception handlers, it will be appreciated that other techniques may be used to achieve similar functionality.

Flow progresses to operation 304, where in indication of a memory API call may be received. In an example, the indication may be received from a hook on a memory API that was generated at operation 302 that may have been called by a set of software instructions. In some examples, execution of the set of software instructions and/or the memory API may be suspended while aspects of method 300 are performed. In other examples, at least some of the aspects described herein may be performed substantially contemporaneously and/or after execution of the set of software instructions or the memory API, among other examples.

At operation 306, memory information associated with the execution of the set of software instructions may be generated. In an example, the memory information may comprise an indication relating to one or more protection attributes associated with the range of memory of the memory API call. For example, if the call to the memory API requested memory that was both executable and writeable, the memory information may comprise an indication that the set of software instructions requested memory having protection attributes indicating memory that is both executable and writeable. In another example, the memory information may comprise information associated with the evaluation of one or more security criteria according to aspects disclosed herein. While example memory information is described herein, it will be appreciated that additional and/or alternative memory information may be generated. In examples, the generated memory information may be stored.

Flow progresses to determination 308, where it may be determined whether protection attributes should be modified. In an example, the determination may comprise evaluating whether the protection attributes associated with the memory API call indicate that the associated memory would be both executable and writeable, such that flow may branch YES. If, by contrast, it is determined that the associated memory would not be both executable and writeable, but rather would be read-only, write-only, or read/write, for example, flow may instead branch NO. While example determinations are discussed with respect to determination 308, it will be appreciated that other factors may be considered to determine whether the protection attributes should be modified.

If it is determined that the protection attributes should not be modified, flow branches NO to operation 310, where normal device operation may occur. In some examples where execution was suspended, execution of the set of software instructions and/or the API may resume. Flow is illustrated as returning to operation 304 to form a loop, as the operations may be performed when another API call is made by the same or a different set of software instructions. If, however, it is determined at determination 308 that the memory protection attributes should be modified, flow instead branches YES to operation 312, where one or more protection attributes associated with the memory API may be modified.

As an example, if the memory API comprises a call associated with protection attributes that indicate the associated memory would be both executable and writeable, the protection attributes may be modified to yield memory having either an executable protection attribute or a writeable protection attribute, but not both. In some examples, the determination may comprise an evaluation of the set of software instructions and/or the called memory API to determine which type of memory is needed by the set of software instructions. It will be appreciated that other factors or evaluation techniques may be used to determine the way in which the protection attributes should be modified.

In another example, the set of software instructions may require memory that is simultaneously executable and writeable. As an example, this may be the case for a set of software instructions that is self-modifying, among other examples. In such examples, the set of software instructions may be evaluated based on security criteria to determine whether memory having such protection attributes should be made available to the set of software instructions. In an example, a prompt may be presented to a user, wherein user input may be received indicating whether the set of software instructions should be permitted to have both executable and writeable memory. If it is determined that the set of software instructions should have access to memory that is both executable and writeable, the protection attributes may be unmodified. Otherwise, the protection attributes may be modified as discussed above. Flow may then continue to operation 310, which was discussed above.

Figure 4A:
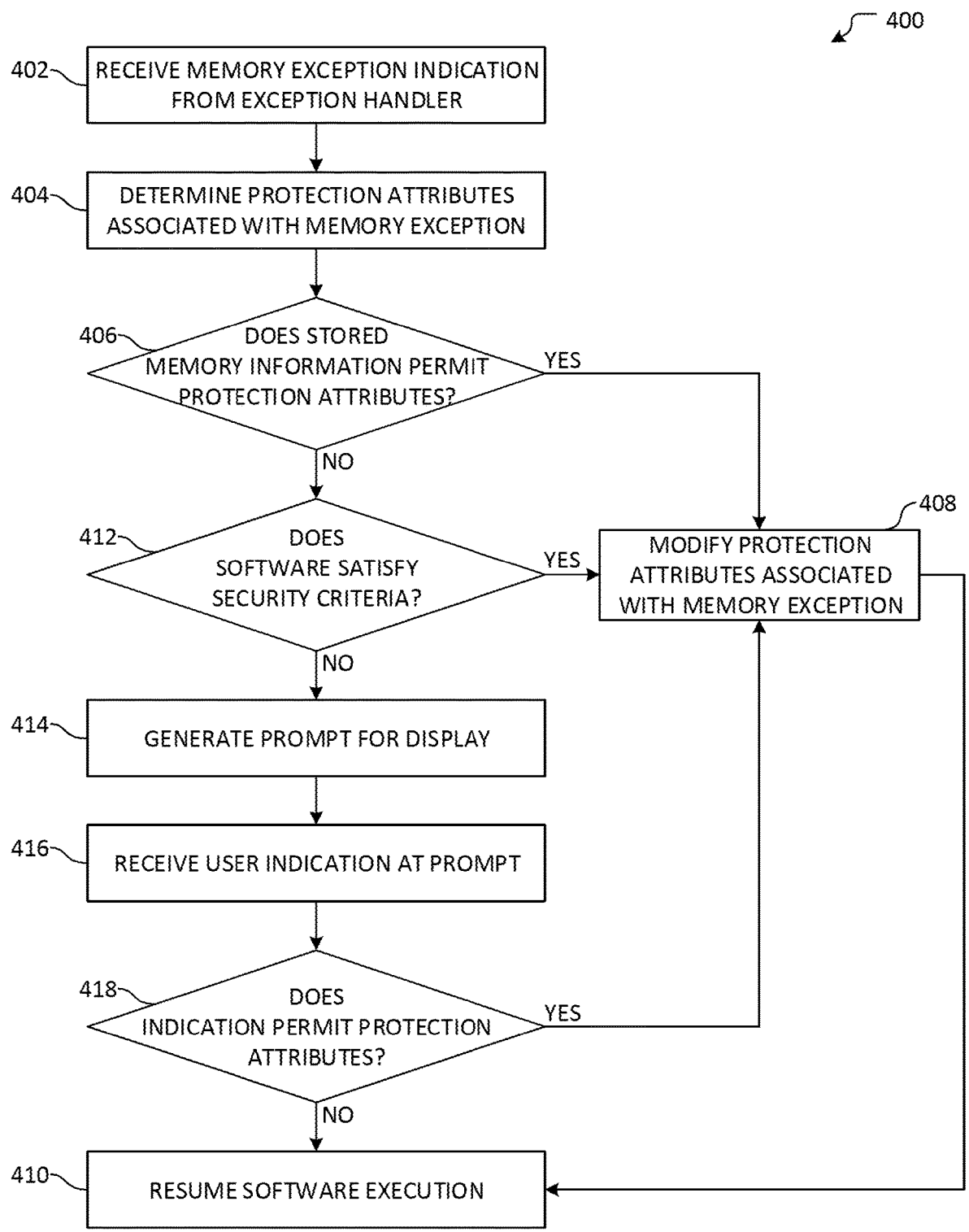
FIG. 4A illustrates an overview of an example method for executable memory protection.

FIG. 4A illustrates an overview of an example method 400 for executable memory protection. In an example, method 400 may be performed by a computing device and/or may be performed by a threat processor, such as threat processor 112 in FIG. 1 or user-mode threat processor 210/kernel-mode threat processor 212 in FIG. 2. Method 400 begins at operation 402, where an indication may be received from an exception handler. In an example, the exception handler may be similar to exception handler 116 in FIG. 1 and/or exception handler 216 in FIG. 2. In some examples, the indication may be received when a set of software instructions encounters a memory exception, which may be the result of protection attribute modification (e.g., as may occur as a result of operation 312 in FIG. 3).

Flow progresses to operation 404, where protection attributes associated with the memory exception may be determined. In an example, the indication received at operation 402 may indicate the protection attributes. In another example, determining the protection attributes may comprise evaluating one or more API calls (e.g., to modify memory, to allocate/deallocate memory, etc.).

At determination 406, stored memory information may be evaluated to determine whether memory having the determined protection attributes is permitted. The determination may comprise evaluating protection attributes stored by the memory information, which, in an example, may have been stored when the memory was allocated by the set of software instructions (e.g., at operation 306 of FIG. 3). In another example, the determination may comprise evaluating information associated with a previous evaluation of security criteria, which may have been stored as part of the memory information. It will be appreciated that other aspects of the stored memory information may be used to determine whether the protection attributes are permitted.

If it is determined that the memory information permits the protection attributes, flow branches YES to operation 408, where the protection attributes associated with the memory exception may be modified. As described herein, this may comprise modifying the protection attributes to provide protection attributes suitable to continue software execution, while also ensuring, in some circumstances, that the associated memory is not both executable and writeable. For example, if the memory is currently writeable, but the exception was thrown as a result of attempting to execute the memory, the memory may be made executable, while stripping the writeable protection attribute of the memory. As another example, if the memory is currently executable and the exception was thrown as a result of attempting to write to the memory, the memory may be made writeable, while stripping the executable protection attribute of the memory. As described here, it will be appreciated that circumstances may exist in which the memory may be permitted to be both executable and writeable (e.g., self-modifying code, just-in-time compilation, etc.).

Flow progresses from operation 408 to operation 410, where software execution may be resumed. As an example, once the protection attributes have been modified to resolve the memory exception, the memory access request may be retried by the set of software instructions such that execution may continue. Eventually, aspects of method 400 may be performed again when the set of software instructions encounters another memory exception. For example, repeated performance of method 400 may enable a set of software instructions to cycle between executable and writeable memory as needed, such that the software may not have simultaneous access to memory that is executable and writeable. Further, the transition between cycles may be relatively transparent to the set of software instructions. Flow terminates at operation 410.

Figure 4B:
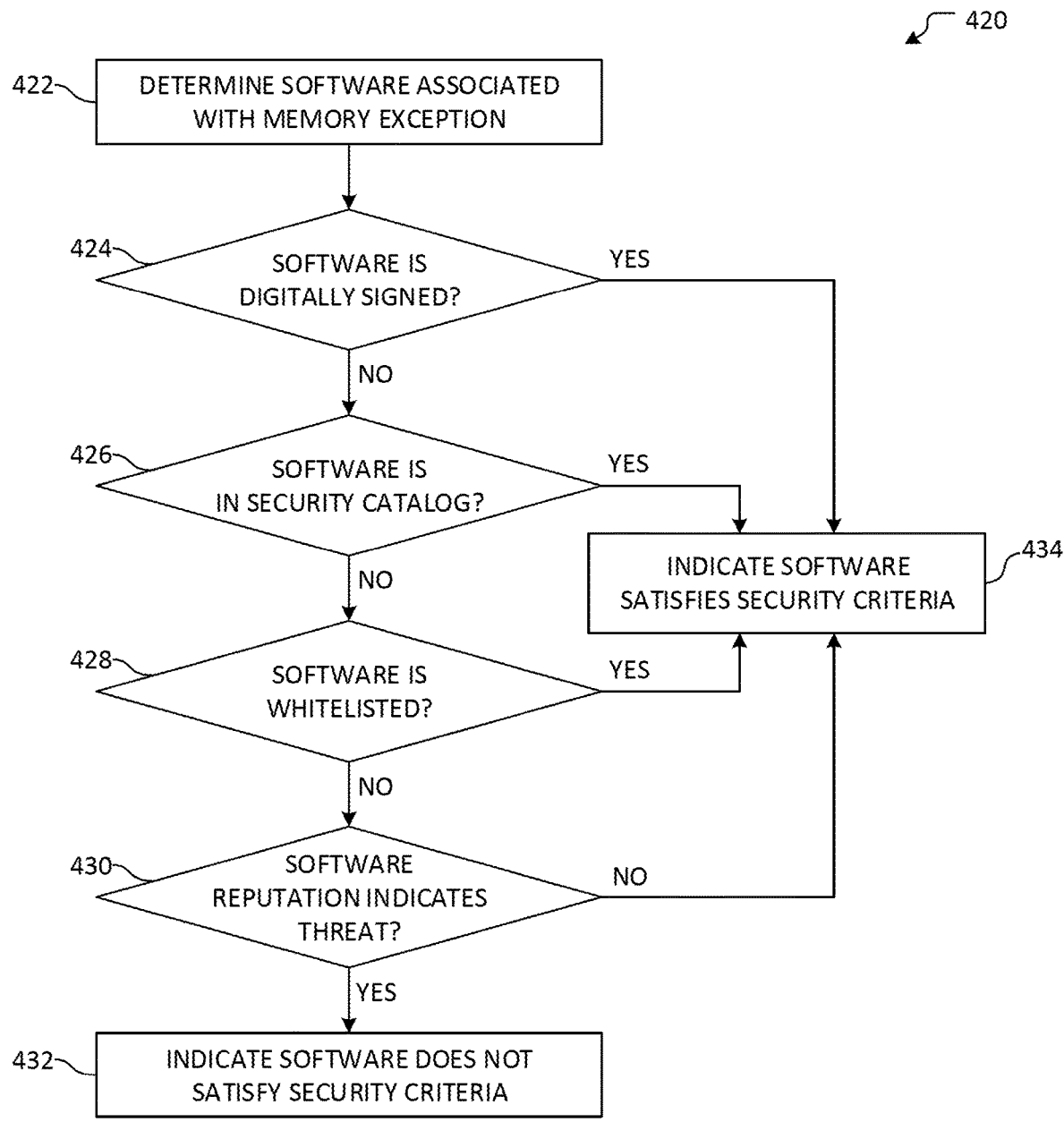
FIG. 4B illustrates an overview of an example method for evaluating security criteria during aspects of executable memory protection.

If, however, it is determined that the memory information does not permit the protection attributes, flow instead branches NO, where it may be determined whether the set of software instructions satisfies one or more security criteria. FIG. 4B illustrates an example evaluation of security criteria. For example, security criteria may include whether the set of software instructions is digitally signed by a trusted certificate and/or a certificate issued by a trusted certificate authority, whether the set of software instructions is listed in a security catalog, whether the set of software instructions has been whitelisted (e.g., by a user, by a system administrator, by an automated process, etc.), and/or an analysis of reputation information from a security service (e.g., whether the set of software instructions has been identified as potentially malicious, whether the reputation of the set of software instructions is below a threshold, etc.). In some examples, the type and/or rigor of the evaluation that is performed may vary depending on a variety of factors, including, but not limited to, the type of software (e.g., whether the software is an application, a plugin, a driver, etc.) and/or whether the software is executing in user mode and/or kernel mode. In other examples, at least some aspects of the evaluation may be cached, thereby potentially reducing the computing overhead associated with repeatedly evaluating such security criteria.

If it is determined that the set of software instructions satisfies the security criteria, flow branches YES to operations 408 and 410, which are discussed above. If, however, it is not determined that the set of software instructions satisfies the security criteria, flow instead branches NO to operation 414, where a prompt may be generated for display. In an example, the prompt may comprise a display of information associated with the memory exception (e.g., information relating to the set of software instructions, information relating to an evaluation of the security criteria, education materials, etc.) and/or one or more suggested actions. The prompt may request user input regarding whether the set of software instructions should be granted access to memory having the determined protection attributes.

Moving to operation 416, a user indication may be received at the generated prompt. In an example, the indication may comprise an "allow" or "deny" indication, may include a whitelist indication, or may comprise a blacklist indication, among other indications. Flow progresses to determination 418, where it may be determined whether the indication permits the protection attributes. If the indication permits the protection attributes, flow branches YES to operations 408 and 410, which are discussed above.

If, however, the indication does not permit the protection attributes, flow branches NO to operation 410, where software execution resumes without first modifying the memory protection attributes. In an example, data regarding the execution of the set of software instructions may be gathered for contemporaneous or later analysis. In examples, the set of software instructions may crash or exhibit unexpected behavior as a result of continued execution with the unmodified (e.g., improper or under-permissive, etc.) protection attributes. While method 400 is discussed with respect to continued software execution, it will be appreciated that other actions may be taken if it is not determined that the protection attributes should be modified. For example, software execution may be terminated. Further, it will be appreciated that while an example set of determinations are discussed above (e.g., determinations 406, 412, and 418), fewer, additional, or alternative determinations may be used. For example, flow may arrive at one of operations 408 or 410 based solely on determination 406, such that an evaluation of memory information may determine whether the protection attributes may be modified. Flow terminates at operation 410.

FIG. 4B illustrates an overview of an example method 420 for evaluating security criteria during aspects of executable memory protection. In an example, method 420 may be performed by a computing device and/or may be performed by a threat processor, such as threat processor 112 in FIG. 1 or user-mode threat processor 210/kernel-mode threat processor 212 in FIG. 2. In some examples, aspects of method 420 may be performed at determination 412 as discussed above with respect to FIG. 4A, respectively. Method 420 begins at operation 422, where software associated with a memory exception may be determined. In an example, the determination may comprise evaluating a call stack associated with the exception and/or evaluating the memory exception itself.

Flow progresses to determination 424, where it may be determined whether the set of software instructions is digitally signed. In some examples, the determination may comprise performing a cryptographic verification of the set of software instructions using a cryptographic key or certificate. In other examples, a certificate authority that issued and/or signed the cryptographic key or certificate may be validated. While example signature verification techniques are described, it will be appreciated that any of a variety of other techniques may be used.

If it is determined that the set of software instructions is digitally signed, flow branches YES to operation 434, where it may be indicated that the software satisfies the security criteria. In some examples, the indication may be provided for incorporation into an evaluation that determines whether memory having a certain set of protection attributes should be granted (e.g., determination 412 in FIG. 4A). In an example, aspects of the evaluation performed by method 420 may be cached as a cache entry, such that a later evaluation of the set of software instructions may be evaluated based at least in part on the cached evaluation, which may thereby reduce at least a part of the processing associated with the evaluation. Flow terminates at operation 434.

If, however, it is not determined that the set of software instructions is digitally signed, flow instead branches NO to determination 426, where it may be determined whether the set of software instructions is listed in a security catalog. For example, the security catalog may be provided by an OS executing on the computing device, and may comprise one or more hashes, GUIDs, or other information that may be used to validate the set of software instructions. If it is determined that the set of software instructions is listed in the security catalog, flow branches YES to operation 434, where it may be indicated that the software satisfies the security criteria, as was discussed above.

If, however, it is determined that the set of software instructions is not listed in the security catalog, flow instead branches NO to operation 428, where it may be determined whether the set of software instructions has been whitelisted. In examples, a whitelist may be generated based on received input from a user or administrator, or may be generated automatically based on an evaluation of software existing on the computing device, among other examples. In some examples, the evaluation may comprise evaluating a blacklist to determine whether the set of software instructions has been blacklisted. If it is determined that the set of software instructions has been whitelisted (and/or, in some examples, has not been blacklisted), flow branches YES to operation 434, where it may be indicated that the software satisfies the security criteria, as was discussed above.

If, however, it is determined that the set of software instructions has not been whitelisted, flow instead branches NO to operation 430, where it may be determined whether reputation information associated with the set of software instructions indicates that the set of software instructions may be a threat. In an example, the reputation information may be retrieved from a local reputation data store (e.g., cached or stored reputation data on a computing device, such as computing devices 102 or 200 in FIG. 1 or 2, respectively) and/or may be retrieved from a remote reputation data store (e.g., reputation data store 118 in FIG. 1). In some examples, the determination may comprise using a threshold information to evaluate at least a part of the reputation information, wherein if the reputation information is below the threshold, the set of software instructions may be determined to pose a potential threat. In other examples, the determination may comprise evaluating an indication provided by the reputation information, wherein the reputation information may indicate that the set of software instructions are malicious or benign, among other indications. While example evaluations of reputation information are described herein, it will be appreciated that reputation information may comprise any of a variety of information and, accordingly, may be evaluated using any of a variety of techniques.

If it is determined that the reputation information does not indicate that the set of software instructions is not a potential threat, flow branches NO to operation 434, which is described above. However, if it is determined that the reputation information indicates that the set of software instructions is a potential threat, flow instead branches YES to operation 432, where it may be indicated that the set of software instructions does not satisfy the security criteria. Thus, flow terminates at one of operations 432 or 434.

In examples, one or more of determination operations 424-430 may be omitted in order to provide an evaluation of security criteria having a decreased level of rigor. For example, software executing in kernel mode may be subject to a higher level of rigor as compared to software executing in user mode. It will be appreciated that while example security criteria and determinations are discussed herein, alternative, additional, or fewer criteria and/or determinations may be used without departing from the spirit of this disclosure.

Figure 5:
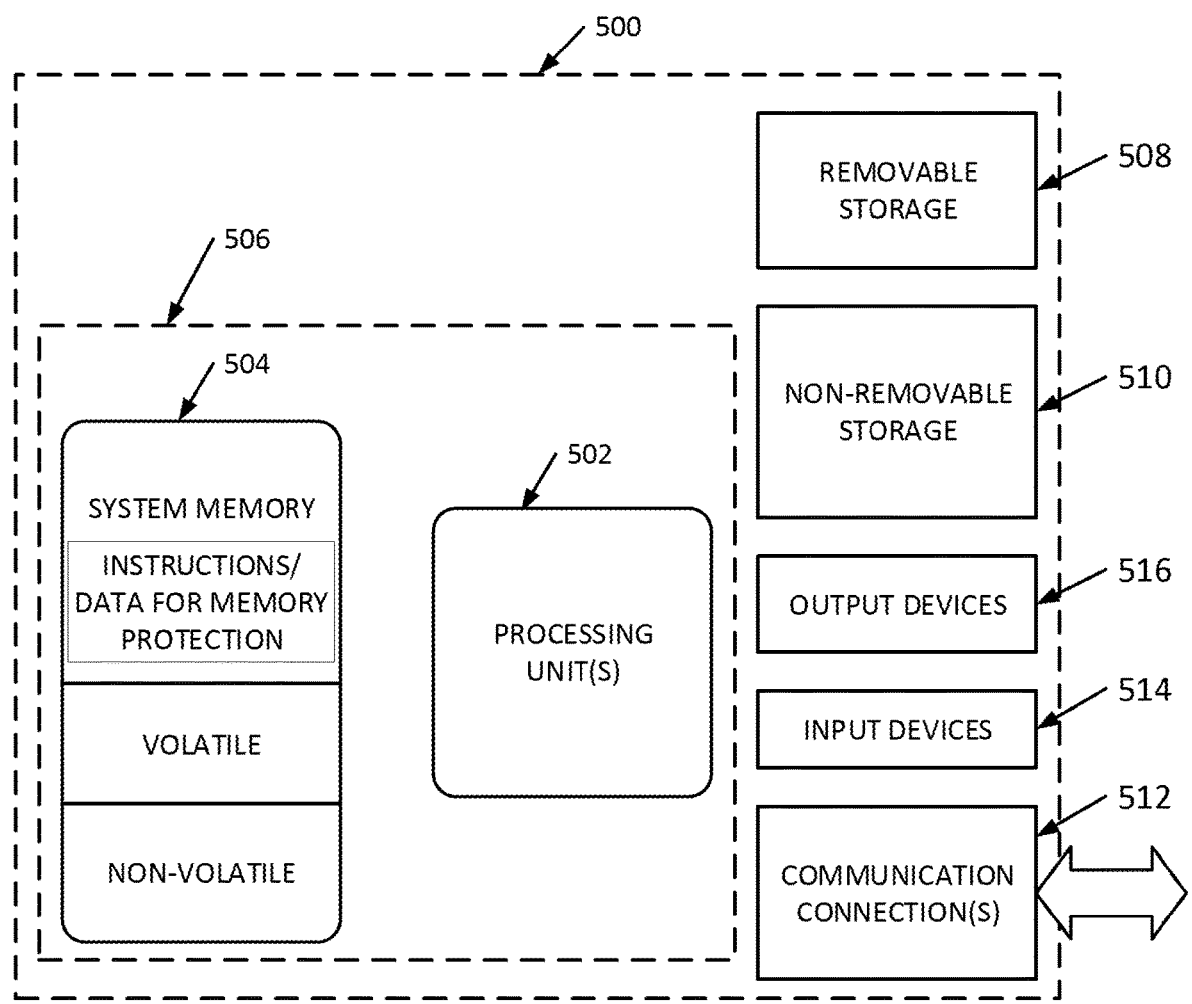
FIG. 5 illustrates one example of a suitable operating environment in which one or more of the present embodiments may be implemented.

FIG. 5 illustrates one example of a suitable operating environment 500 in which one or more of the present embodiments may be implemented. This is only one example of a suitable operating environment and is not intended to suggest any limitation as to the scope of use or functionality. Other well-known computing systems, environments, and/or configurations that may be suitable for use include, but are not limited to, personal computers, server computers, hand-held or laptop devices, multiprocessor systems, microprocessor-based systems, programmable consumer electronics such as smart phones, network PCs, minicomputers, mainframe computers, distributed computing environments that include any of the above systems or devices, and the like.

In its most basic configuration, operating environment 500 typically includes at least one processing unit 502 and memory 504. Depending on the exact configuration and type of computing device, memory 504 (storing, among other things, memory and/or reputation information, a whitelist and/or blacklist, instructions to perform the methods disclosed herein, etc.) may be volatile (such as RAM), non-volatile (such as ROM, flash memory, etc.), or some combination of the two. This most basic configuration is illustrated in FIG. 5 by dashed line 506. Further, environment 500 may also include storage devices (removable, 508, and/or non-removable, 510) including, but not limited to, magnetic or optical disks or tape. Similarly, environment 500 may also have input device(s) 514 such as keyboard, mouse, pen, voice input, etc. and/or output device(s) 516 such as a display, speakers, printer, etc. Also included in the environment may be one or more communication connections, 512, such as LAN, WAN, point to point, etc.

Operating environment 500 typically includes at least some form of computer readable media. Computer readable media can be any available media that can be accessed by processing unit 502 or other devices comprising the operating environment. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other tangible, non-transitory medium which can be used to store the desired information. Computer storage media does not include communication media.

Communication media embodies computer readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The operating environment 500 may be a single computer operating in a networked environment using logical connections to one or more remote computers. The remote computer may be a personal computer, a server, a router, a network PC, a peer device or other common network node, and typically includes many or all of the elements described above as well as others not so mentioned. The logical connections may include any method supported by available communications media. Such networking environments are commonplace in offices, enterprise-wide computer networks, intranets and the Internet.

As will be understood from the foregoing disclosure, one aspect of the technology relates to a system comprising: at least one processor; and memory storing instructions that, when executed by the at least one processor, causes the system to perform a set of operations. The set of operations comprises: generating a hook on a memory application programming interface (API), wherein the hook is associated with the threat processor; receiving, by a threat processor, an indication from the generated hook, wherein the indication is received in response to a set of software instructions generating a call to the memory API; based on the received indication, generating stored memory information comprising one or more protection attributes associated with the call to the memory API; determining whether the one or more protection attributes indicate memory that is executable and writeable; based on determining the one or more protection attributes indicate memory that is executable and writeable, modifying the one or more protection attributes to generate modified protection attributes; and continuing execution of the set of software instructions based on the modified protection attributes. In an example, the set of operations further comprises: registering an exception handler; receiving, by the threat processor, an indication of a memory exception from the exception handler, wherein the memory exception is associated with accessing memory having the modified protection attributes by the set of software instructions; determining one or more requested protection attributes associated with the memory exception; determining, based on the stored memory information, whether the set of software instructions is permitted access to memory having at least one of the one or more requested protection attributes; based on determining that the set of software is permitted access to memory having the at least one of the one or more requested protection attributes, modifying the memory having the modified protection attributes based on the one or more requested protection attributes; and continuing execution of the set of software instructions using the memory. In another example, modifying the one or more protection attributes to generate modified protection attributes comprises generating modified protection attributes that indicate memory that is one of executable or writeable. In a further example, modifying the one or more protection attributes to generate modified protection attributes comprises: determining whether the set of software instructions needs access to memory that is both executable and writeable; based on determining that the set of software instructions needs access to memory that is both executable and writeable, determining whether the set of software instructions is permitted access to memory that is both executable and writeable; and when it is determined that the set of software instructions is not permitted access to memory that is both executable and writeable, modifying the one or more protection attributes to generate the modified protection attributes. In yet another example, the set of operations further comprises: based on determining that the set of software is not permitted access to memory having the at least one of the one or more requested protection attributes, retaining the modified protection attributes; and continuing execution of the set of software instructions using the memory having the modified protection attributes. In a further still example, modifying the memory having the modified protection attributes based on the one or more requested protection attributes comprises: when the modified protection attributes indicate writeable memory, modifying protection attributes associated with the memory to be executable and not writeable; and when the modified protection attributes indicate executable memory, modifying protection attributes associated with the memory to be writeable and not executable. In another example, determining whether the set of software instructions is permitted access to memory having at least one of the one or more requested protection attributes comprises: determining whether the set of software instructions needs access to memory that is both executable and writeable; based on determining that the set of software instructions needs access to memory that is both executable and writeable, determining whether the set of software instructions is permitted access to memory that is both executable and writeable.

In another aspect, the technology relates to a method for protecting executable memory. The method comprises: registering an exception handler; receiving, by the threat processor, an indication of a memory exception from the exception handler, wherein the memory exception is associated with a set of software instructions accessing memory associated with one or more current protection attributes; determining one or more requested protection attributes associated with the memory exception; determining whether the set of software instructions is permitted access to memory having at least one of the one or more requested protection attributes; based on determining that the set of software is permitted access to memory having the at least one of the one or more requested protection attributes, modifying the memory associated with the current protection attributes based on the one or more requested protection attributes; and continuing execution of the set of software instructions using the memory. In an example, the method further comprises: based on determining that the set of software is not permitted access to memory having the at least one of the one or more requested protection attributes, retaining the current protection attributes; and continuing execution of the set of software instructions using the memory having the current protection attributes. In another example, determining whether the set of software instructions is permitted access to memory having at least one of the one or more requested protection attributes comprises evaluating stored memory information. In a further example, determining whether the set of software instructions is permitted access to memory having at least one of the one or more requested protection attributes comprises: determining whether the set of software instructions needs access to memory that is both executable and writeable; based on determining that the set of software instructions needs access to memory that is both executable and writeable, determining whether the set of software instructions is permitted access to memory that is both executable and writeable. In yet another example, modifying the memory associated with the current protection attributes based on the one or more requested protection attributes comprises: when the current protection attributes indicate writeable memory, modifying protection attributes associated with the memory to be executable and not writeable; and when the current protection attributes indicate executable memory, modifying protection attributes associated with the memory to be writeable and not executable. In a further still example, the stored memory information is generated by the threat processor based on a call by the set of software instructions to a memory application programming interface (API), and the memory information comprises one or more protection attributes associated with the call to the memory API.

In a further aspect, the technology relates to a method for protecting executable memory. The method comprises: generating a hook on a memory application programming interface (API), wherein the hook is associated with the threat processor; receiving, by a threat processor, an indication from the generated hook, wherein the indication is received in response to a set of software instructions generating a call to the memory API; based on the received indication, generating stored memory information comprising one or more protection attributes associated with the call to the memory API; determining whether the one or more protection attributes indicate memory that is executable and writeable; based on determining the one or more protection attributes indicate memory that is executable and writeable, modifying the one or more protection attributes to generate modified protection attributes; and continuing execution of the set of software instructions based on the modified protection attributes. In an example, the method further comprises: registering an exception handler; receiving, by the threat processor, an indication of a memory exception from the exception handler, wherein the memory exception is associated with accessing memory having the modified protection attributes by the set of software instructions; determining one or more requested protection attributes associated with the memory exception; determining, based on the stored memory information, whether the set of software instructions is permitted access to memory having at least one of the one or more requested protection attributes; based on determining that the set of software is permitted access to memory having the at least one of the one or more requested protection attributes, modifying the memory having the modified protection attributes based on the one or more requested protection attributes; and continuing execution of the set of software instructions using the memory. In another example, modifying the one or more protection attributes to generate modified protection attributes comprises generating modified protection attributes that indicate memory that is one of executable or writeable. In a further example, modifying the one or more protection attributes to generate modified protection attributes comprises: determining whether the set of software instructions needs access to memory that is both executable and writeable; based on determining that the set of software instructions needs access to memory that is both executable and writeable, determining whether the set of software instructions is permitted access to memory that is both executable and writeable; and when it is determined that the set of software instructions is not permitted access to memory that is both executable and writeable, modifying the one or more protection attributes to generate the modified protection attributes. In yet another example, the method further comprises: based on determining that the set of software is not permitted access to memory having the at least one of the one or more requested protection attributes, retaining the modified protection attributes; and continuing execution of the set of software instructions using the memory having the modified protection attributes. In a further still example, modifying the memory having the modified protection attributes based on the one or more requested protection attributes comprises: when the modified protection attributes indicate writeable memory, modifying protection attributes associated with the memory to be executable and not writeable; and when the modified protection attributes indicate executable memory, modifying protection attributes associated with the memory to be writeable and not executable. In another example, determining whether the set of software instructions is permitted access to memory having at least one of the one or more requested protection attributes comprises: determining whether the set of software instructions needs access to memory that is both executable and writeable; based on determining that the set of software instructions needs access to memory that is both executable and writeable, determining whether the set of software instructions is permitted access to memory that is both executable and writeable.

Aspects of the present disclosure, for example, are described above with reference to block diagrams and/or operational illustrations of methods, systems, and computer program products according to aspects of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more aspects provided in this application are not intended to limit or restrict the scope of the disclosure as claimed in any way. The aspects, examples, and details provided in this application are considered sufficient to convey possession and enable others to make and use the best mode of claimed disclosure. The claimed disclosure should not be construed as being limited to any aspect, example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate aspects falling within the spirit of the broader aspects of the general inventive concept embodied in this application that do not depart from the broader scope of the claimed disclosure.

What is claimed is:

1. A system comprising:
    at least one processor; and
    memory storing instructions that, when executed by the at least one processor, causes the system to perform a set of operations, the set of operations comprising:
        generating a hook on a memory application programming interface (API), wherein the hook is associated with a threat processor;
        registering an exception handler;
        receiving, by the threat processor, an indication from the generated hook, wherein the indication is received in response to a set of software instructions generating a call to the memory API;
        based on the received indication, generating stored memory information comprising one or more protection attributes associated with the call to the memory API;
        determining whether the one or more protection attributes indicate memory that is executable and writeable;
        based on determining the one or more protection attributes indicate memory that is executable and writeable, modifying the one or more protection attributes to generate modified protection attributes;
        continuing execution of the set of software instructions based on the modified protection attributes;
        receiving, by the threat processor, an indication of a memory exception from the exception handler, wherein the memory exception is associated with accessing memory having the modified protection attributes by the set of software instructions;
        determining one or more requested protection attributes associated with the memory exception;
        determining, based on the stored memory information, whether the set of software instructions is permitted access to memory having at least one of the one or more requested protection attributes;
        upon determining that the set of software instructions is permitted access to memory having at least one of the one or more requested protection attributes:
            modifying the memory having the modified protection attributes based on the one or more requested protection attributes;
        upon determining that the set of software instructions is not permitted access to memory having at least one of the one or more requested protection attributes:
            based on determining that the set of software instructions satisfies one or more security criteria, modifying the memory having the modified protection attributes based on the one or more requested protection attributes;
            based on determining that the set of software instructions does not satisfy one or more security criteria:
                generating a prompt for display to a user requesting input regarding whether the set of software instructions should be permitted access to memory having at least one of the one or more requested protection attributes,
                receiving a user indication in response to the generated prompt,
                based on determining that the user indication permits the set of software instructions to access to memory having at least one of the one or more requested protection attributes, modifying the memory having the modified protection attributes based on the one or more requested protection attributes; and
        resuming software execution.

2. The system of claim 1, wherein modifying the one or more protection attributes to generate modified protection attributes comprises generating modified protection attributes that indicate memory that is one of executable or writeable.

3. The system of claim 1, wherein modifying the one or more protection attributes to generate modified protection attributes comprises:
    determining whether the set of software instructions needs access to memory that is both executable and writeable;
    based on determining that the set of software instructions needs access to memory that is both executable and writeable, determining whether the set of software instructions is permitted access to memory that is both executable and writeable; and
    when it is determined that the set of software instructions is not permitted access to memory that is both executable and writeable, modifying the one or more protection attributes to generate the modified protection attributes.

4. The system of claim 1, wherein the set of operations further comprises:
    based on determining that the set of software is not permitted access to memory having the at least one of the one or more requested protection attributes, retaining the modified protection attributes; and
    continuing execution of the set of software instructions using the memory having the modified protection attributes.

5. The system of claim 1, wherein modifying the memory having the modified protection attributes based on the one or more requested protection attributes comprises:
    when the modified protection attributes indicate writeable memory, modifying protection attributes associated with the memory to be executable and not writeable; and
    when the modified protection attributes indicate executable memory, modifying protection attributes associated with the memory to be writeable and not executable.

6. The system of claim 1, wherein determining whether the set of software instructions is permitted access to memory having at least one of the one or more requested protection attributes comprises:
    determining whether the set of software instructions needs access to memory that is both executable and writeable;
    based on determining that the set of software instructions needs access to memory that is both executable and writeable, determining whether the set of software instructions is permitted access to memory that is both executable and writeable.

7. A method for protecting executable memory, comprising:
    registering an exception handler;

receiving, by a threat processor, an indication of a memory exception from the exception handler, wherein the memory exception is associated with a set of software instructions accessing memory associated with one or more current protection attributes;

determining one or more requested protection attributes associated with the memory exception;

determining whether the set of software instructions is permitted access to memory having at least one of the one or more requested protection attributes;

upon determining that the set of software is permitted access to memory having the at least one of the one or more requested protection attributes:
  modifying the memory associated with the current protection attributes based on the one or more requested protection attributes;

upon determining that the set of software instructions is not permitted access to memory having at least one of the one or more requested protection attributes:
  based on determining that the set of software instructions satisfies one or more security criteria, modifying the memory having the modified protection attributes based on the one or more requested protection attributes;
  based on determining that the set of software instructions does not satisfy one or more security criteria:
    generating a prompt for display to a user requesting input regarding whether the set of software instructions should be permitted access to memory having at least one of the one or more requested protection attributes,
    receiving a user indication in response to the generated prompt,
    based on determining that the user indication permits the set of software instructions to access to memory having at least one of the one or more requested protection attributes, modifying the memory having the modified protection attributes based on the one or more requested protection attributes; and continuing execution of the set of software instructions using the memory.

8. The method of claim 7, further comprising:
based on determining that the set of software is not permitted access to memory having the at least one of the one or more requested protection attributes, retaining the current protection attributes; and
continuing execution of the set of software instructions using the memory having the current protection attributes.

9. The method of claim 7, wherein determining whether the set of software instructions is permitted access to memory having at least one of the one or more requested protection attributes comprises evaluating stored memory information.

10. The method of claim 7, wherein determining whether the set of software instructions is permitted access to memory having at least one of the one or more requested protection attributes comprises:
determining whether the set of software instructions needs access to memory that is both executable and writeable;
based on determining that the set of software instructions needs access to memory that is both executable and writeable, determining whether the set of software instructions is permitted access to memory that is both executable and writeable.

11. The method of claim 7, wherein modifying the memory associated with the current protection attributes based on the one or more requested protection attributes comprises:
when the current protection attributes indicate writeable memory, modifying protection attributes associated with the memory to be executable and not writeable; and
when the current protection attributes indicate executable memory, modifying protection attributes associated with the memory to be writeable and not executable.

12. The method of claim 9, wherein the stored memory information is generated by the threat processor based on a call by the set of software instructions to a memory application programming interface (API), and wherein the memory information comprises one or more protection attributes associated with the call to the memory API.

13. A method for protecting executable memory, comprising:
generating a hook on a memory application programming interface (API), wherein the hook is associated with a threat processor;
registering an exception handler;
receiving, by the threat processor, an indication from the generated hook, wherein the indication is received in response to a set of software instructions generating a call to the memory API;
based on the received indication, generating stored memory information comprising one or more protection attributes associated with the call to the memory API;
determining whether the one or more protection attributes indicate memory that is executable and writeable;
based on determining the one or more protection attributes indicate memory that is executable and writeable, modifying the one or more protection attributes to generate modified protection attributes;
continuing execution of the set of software instructions based on the modified protection attributes;
receiving, by the threat processor, an indication of a memory exception from the exception handler, wherein the memory exception is associated with accessing memory having the modified protection attributes by the set of software instructions;
determining one or more requested protection attributes associated with the memory exception;
determining, based on the stored memory information, whether the set of software instructions is permitted access to memory having at least one of the one or more requested protection attributes;
upon determining that the set of software instructions is permitted access to memory having at least one of the one or more requested protection attributes:
  modifying the memory having the modified protection attributes based on the one or more requested protection attributes;
upon determining that the set of software instructions is not permitted access to memory having at least one of the one or more requested protection attributes:
  based on determining that the set of software instructions satisfies one or more security criteria, modifying the memory having the modified protection attributes based on the one or more requested protection attributes;
  based on determining that the set of software instructions does not satisfy one or more security criteria:

generating a prompt for display to a user requesting input regarding whether the set of software instructions should be permitted access to memory having at least one of the one or more requested protection attributes, receiving a user indication in response to the generated prompt, based on determining that the user indication permits the set of software instructions to access to memory having at least one of the one or more requested protection attributes, modifying the memory having the modified protection attributes based on the one or more requested protection attributes; and resuming software execution.

14. The method of claim 13, wherein modifying the one or more protection attributes to generate modified protection attributes comprises generating modified protection attributes that indicate memory that is one of executable or writeable.

15. The method of claim 13, wherein modifying the one or more protection attributes to generate modified protection attributes comprises:

determining whether the set of software instructions needs access to memory that is both executable and writeable;

based on determining that the set of software instructions needs access to memory that is both executable and writeable, determining whether the set of software instructions is permitted access to memory that is both executable and writeable; and when it is determined that the set of software instructions is not permitted access to memory that is both executable and writeable, modifying the one or more protection attributes to generate the modified protection attributes.

16. The method of claim 13, further comprising:

based on determining that the set of software is not permitted access to memory having the at least one of the one or more requested protection attributes, retaining the modified protection attributes; and continuing execution of the set of software instructions using the memory having the modified protection attributes.

17. The method of claim 13, wherein modifying the memory having the modified protection attributes based on the one or more requested protection attributes comprises:

when the modified protection attributes indicate writeable memory, modifying protection attributes associated with the memory to be executable and not writeable; and when the modified protection attributes indicate executable memory, modifying protection attributes associated with the memory to be writeable and not executable.

18. The method of claim 13, wherein determining whether the set of software instructions is permitted access to memory having at least one of the one or more requested protection attributes comprises:

determining whether the set of software instructions needs access to memory that is both executable and writeable;

based on determining that the set of software instructions needs access to memory that is both executable and writeable, determining whether the set of software instructions is permitted access to memory that is both executable and writeable.

19. The system of claim 1, wherein the one or more security criteria includes one or more of: whether the set of software instructions is digitally signed, whether the set of software instructions is listed in a security catalog, whether the set of software instructions is whitelisted, and whether reputation information associated with the set of software instructions indicates that the set of software instructions may be a threat.

20. The method of claim 13, wherein the one or more security criteria includes one or more of: whether the set of software instructions is digitally signed, whether the set of software instructions is listed in a security catalog, whether the set of software instructions is whitelisted, and whether reputation information associated with the set of software instructions indicates that the set of software instructions may be a threat.

* * * * *